(12) United States Patent
Park et al.

(10) Patent No.: US 12,556,936 B2
(45) Date of Patent: Feb. 17, 2026

(54) RECONFIGURABLE INTELLIGENT SURFACE AND APPARATUS

(71) Applicant: SAMSUNG ELECTRONICS CO., LTD., Suwon-si (KR)

(72) Inventors: Yuntae Park, Suwon-si (KR); Junhwa Oh, Suwon-si (KR); Sanghyuk Wi, Suwon-si (KR); Jungi Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 348 days.

(21) Appl. No.: 18/485,993

(22) Filed: Oct. 12, 2023

(65) Prior Publication Data

US 2024/0129752 A1   Apr. 18, 2024

(30) Foreign Application Priority Data

Oct. 14, 2022   (KR) ........................ 10-2022-0132111

(51) Int. Cl.
*H01Q 3/46* (2006.01)
*H01Q 15/00* (2006.01)
*H04W 16/28* (2009.01)

(52) U.S. Cl.
CPC .............. *H04W 16/28* (2013.01); *H01Q 3/46* (2013.01)

(58) Field of Classification Search
CPC .... H01Q 3/46; H01Q 15/002; H01Q 15/0086; H01Q 15/148
See application file for complete search history.

(56) References Cited

U.S. PATENT DOCUMENTS

| 10,931,022 | B1 | 2/2021 | Kaddour |
| 2019/0155142 | A1 | 5/2019 | Lai |
| 2022/0252761 | A1 | 8/2022 | Xia |

FOREIGN PATENT DOCUMENTS

| CN | 113782980 A | * 12/2021 | ........... H01Q 15/002 |
| CN | 115149270 A | * 10/2022 | ............... H01Q 3/28 |
| KR | 10-2020-0071590 A1 | 6/2020 | |
| KR | 10-2347529 B1 | 1/2022 | |
| KR | 10-2374152 B1 | 3/2022 | |

\* cited by examiner

*Primary Examiner* — Hoang V Nguyen

(57) ABSTRACT

The disclosure relates to a 5G or 6G communication system to support a higher data transmission rate. The disclosure relates to a reconfigurable intelligent surface (RIS) enabling a low phase error at various incidence angles/reflection angles and an apparatus including the same. The RIS comprises a unit cell pattern formed in a direction corresponding to a polarization direction, the unit cell configured to adjust a reflection phase; a switch operably connected to the unit cell pattern, the switch configured to adjust the reflection phase; and a dummy pattern positioned between unit cell patterns in case that a plurality of unit cells is arranged.

15 Claims, 17 Drawing Sheets

Example of one-bit unit cell

RECONFIGURABLE INTELLIGENT SURFACE AND APPARATUS

CROSS-REFERENCE TO RELATED APPLICATION

This application is based on and claims priority under 35 U. S. C. § 119 to Korean Patent Application No. 10-2022-0132111, filed on Oct. 14, 2022, in the Korean Intellectual Property Office, the disclosure of which is herein incorporated by reference in its entirety.

BACKGROUND

1. Field

The disclosure relates to a reconfigurable intelligent surface (RIS) enabling a low phase error at various incidence angles/reflection angles and an apparatus including the same.

2. Description of Related Art

5th generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G.

In the initial state of 5G mobile communication technologies, in order to support services and to satisfy performance requirements in connection with enhanced Mobile BroadBand, (eMBB), Ultra Reliable & Low Latency Communications (URLLC), and massive Machine-Type Communications (mMTC), there has been ongoing standardization regarding beamforming and massive MIMO for alleviating radio-wave path loss and increasing radio-wave transmission distances in mmWave, numerology (for example, operating multiple subcarrier spacings) for efficiently utilizing mmWave resources and dynamic operation of slot formats, initial access technologies for supporting multi-beam transmission and broadbands, definition and operation of BWP (Bandwidth Part), new channel coding methods such as a LDPC (Low Density Parity Check) code for large-capacity data transmission and a polar code for highly reliable transmission of control information, L2 pre-processing, and network slicing for providing a dedicated network customized to a specific service.

Currently, there is ongoing discussion regarding improvement and performance enhancement of initial 5G mobile communication technologies in view of services to be supported by 5G mobile communication technologies, and there has been physical layer standardization regarding technologies such as V2X for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for securing coverage in an area in which communication with terrestrial networks is impossible, and positioning.

Moreover, there has been ongoing standardization in wireless interface architecture/protocol fields regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service fields regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR), and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for securing coverage in terahertz bands of 6G mobile communication technologies, Full Dimensional MIMO (FD-MIMO), multi-antenna transmission technologies such as array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also fullduplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

An aspect of the disclosure is to provide a reconfigurable intelligent surface (RIS) unit cell enabling a low phase error at various incidence angles/reflection angles, an RIS, and an apparatus including the RIS.

An aspect of the disclosure is to obtain desired performance at a desired frequency and various incidence angles/reflection angles by additionally disposing a dummy pattern between unit cell patterns of an RIS.

The technical subjects pursued in the disclosure may not be limited to the above-mentioned technical subjects, and other technical subjects which are not mentioned may be clearly understood, through the following descriptions, by those skilled in the art to which the disclosure pertains.

To achieve the foregoing aspects, a unit cell for a reconfigurable intelligent surface (RIS) according to an embodiment of the disclosure may include: a unit cell pattern formed in a direction corresponding to a polarization direction to adjust a reflection phase; a switch connected to the unit cell pattern to adjust a reflection phase; and a dummy pattern positioned between the unit cell patterns when a plurality of unit cells is arranged, wherein the dummy pattern may be configured to prevent an increase in capacitance component between the unit cells despite an increase in incidence angle or reflection angle and to maintain a reflection phase difference of the unit cell according to the switch on/off to be an even value despite the increase in incidence angle or reflection angle.

According to an embodiment, the unit cell pattern may include two elements, and the switch may connect the two elements.

According to an embodiment, the dummy pattern may have a symmetric structure.

According to an embodiment, the unit cell pattern may be located in a vertical direction at a center of the unit cell, and the dummy pattern may include a T-shaped pattern disposed on a left side and a right side of the unit cell.

According to an embodiment, the unit cell pattern may be located in a vertical direction at a center of the unit cell, and the dummy pattern may include at least one square-loop pattern disposed on a left side and a right side of the unit cell.

According to an embodiment, the dummy pattern may have the at least one square loop arranged in a cross shape.

According to an embodiment, the reflection phase difference may be 180°.

Further, to achieve the foregoing aspects, a reconfigurable intelligent surface (RIS) according to an embodiment of the disclosure may include at least one unit cell, wherein the unit cell may include: a unit cell pattern formed in a direction corresponding to a polarization direction to adjust a reflection phase; a switch connected to the unit cell pattern to adjust a reflection phase; and a dummy pattern positioned between the unit cell patterns when a plurality of unit cells is arranged, and the dummy pattern may be configured to prevent an increase in capacitance component between the unit cells despite an increase in incidence angle or reflection angle and to maintain a reflection phase difference of the unit cell according to the switch on/off to be an even value despite the increase in incidence angle or reflection angle.

According to an embodiment, the RIS may further include a controller configured to control on/off of the switch.

An embodiment of the disclosure may provide a reconfigurable intelligent surface (RIS) unit cell enabling a low phase error at various incidence angles/reflection angles, an RIS, and an apparatus including the RIS.

An embodiment of the disclosure may enable desired performance to be obtained at a desired frequency and various incidence angles/reflection angles by additionally disposing a dummy pattern between unit cell patterns of an RIS.

Advantageous effects obtainable from the disclosure may not be limited to the above-mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
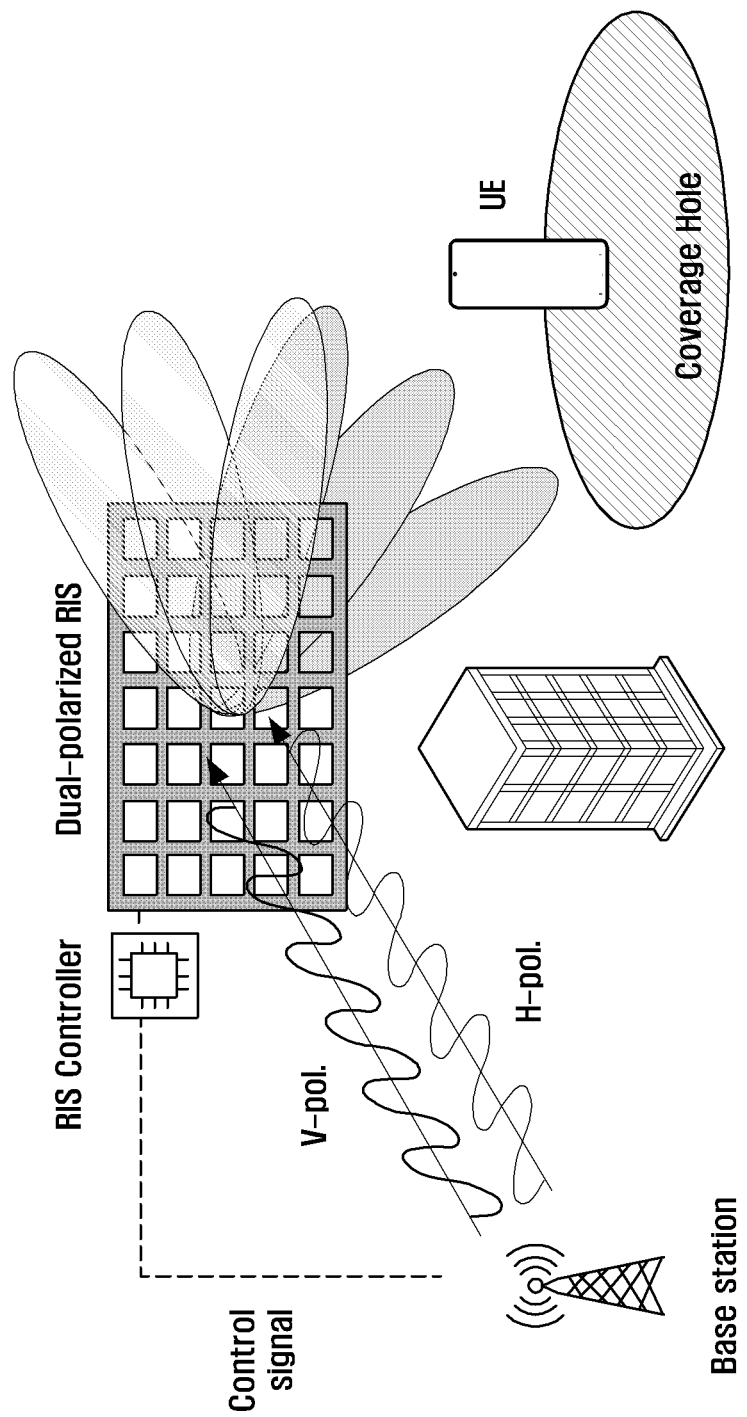
FIG. 1 illustrates an example of a reconfigurable intelligent surface (RIS) and a communication system including the same according to an embodiment of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the disclosure will be described in detail with reference to the accompanying drawings. In describing the disclosure below, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description of the disclosure, a detailed description of known functions or configurations incorporated herein will be omitted when it is determined that the description may make the subject matter of the disclosure unnecessarily unclear. Hereinafter, embodiments of the disclosure will be described with reference to the accompanying drawings.

Hereinafter, the operation principle of the disclosure will be described in detail with reference to the accompanying drawings. The terms which will be described below are terms defined in consideration of the functions in the disclosure. They may be different according to users, intentions of the users, or customs, and therefore, the definitions of the terms should be made based on the contents throughout the specification.

For the same reason, in the accompanying drawings, some elements may be exaggerated, omitted, or schematically illustrated. Furthermore, the size of each element does not completely reflect the actual size.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card.

The specific terms as used in the following description are provided to help an understanding of the disclosure, and these specific terms may be used in different forms without departing from the technical idea of the disclosure.

In the following description, terms for identifying access nodes, terms referring to network entities, terms referring to messages, terms referring to interfaces between network entities, terms referring to various identification information, and the like are illustratively used for the sake of descriptive convenience. Therefore, the disclosure is not limited by the terms as used below, and other terms referring to subjects having equivalent technical meanings may be used.

In the following description of the disclosure, terms and names defined in the 3rd generation partnership project long term evolution (3GPP LTE) standards will be used for the sake of descriptive convenience. However, the disclosure is not limited by these terms and names, and may be applied in the same way to systems that conform other standards. In the disclosure, the term "eNB" may be interchangeably used with the term "gNB." That is, a base station described as "eNB" may indicate "gNB."

FIG. 1 illustrates an example of a reconfigurable intelligent surface (RIS) and a communication system including the same according to an embodiment of the present disclosure.

With an increasing demand for data from wireless communication devices, wireless communication technology is rapidly developing. A fifth-generation (5G) wireless communication system achieves an ultrahigh-speed data rate by utilizing the wide bandwidth of a millimeter wave (mmWave) band. A wireless communication system used in mmWave enables a large-scale antenna array design with a high beamforming gain due to a shorter wavelengths at a mmWave frequency (compared to a microwave band). Despite an advantage of a high gain, a narrow beam width of a large-scale array and low beam diffraction at a high frequency cause a coverage hole in a non-line-of-sight (NLOS) environment. A coverage hole issue will be raised in a sixth-generation (6G) wireless communication, and use of a sub-THz frequency as well as a millimeter wave is currently under discussion and is actively being researched.

Referring to FIG. 1, in a situation where a terminal (user equipment: UE) is located in a coverage hole, the RIS may reflect electromagnetic waves from a base station (BS) in a desired direction to provide an alternative radio propagation path. The RIS is one of key technologies that is implementable in a 6G communication system. Considerable research is being conducted to demonstrate the possibility of generating a communication channel by an RIS when a radio propagation path is blocked by an obstacle. Other research is also being conducted on design of a unit cell structure considering polarization for use in an RIS-based multiple-input multiple-output (MIMO) transmission system. The BS may transmit a control signal to adjust an RIS controller to adjust a reflection direction in which the signal transmitted by the BS is reflected on the RIS, thereby allowing the signal transmitted by the BS to reach the terminal located in the coverage hole.

However, to achieve an RIS in a commercial mobile communication system, various installation environments, such as the locations of a base station, a terminal, and the RIS and polarization, need be considered. In particular, according to a path loss model, a reflection phase change due to incidence and reflection angles may be one major cause of an RIS performance deterioration. Therefore, an RIS design robust to various angle changes is essential. Securing wide beam steering while reducing the overall size of an RIS and using fewer RF components are also important factors to be considered when discussing introduction of an MS.

This present disclosure proposes a dual-polarized unit cell and an array layout suitable for a commercial mmWave communication system using orthogonal dual-polarized waves. Further, a unit cell structure with a dummy pattern that reduces a reflection phase deviation, an MS including a plurality of unit cells, and a device including the same are explained. Subsequently, a result of using the RIS and a customized measurement configuration is also explained.

Figure 2:
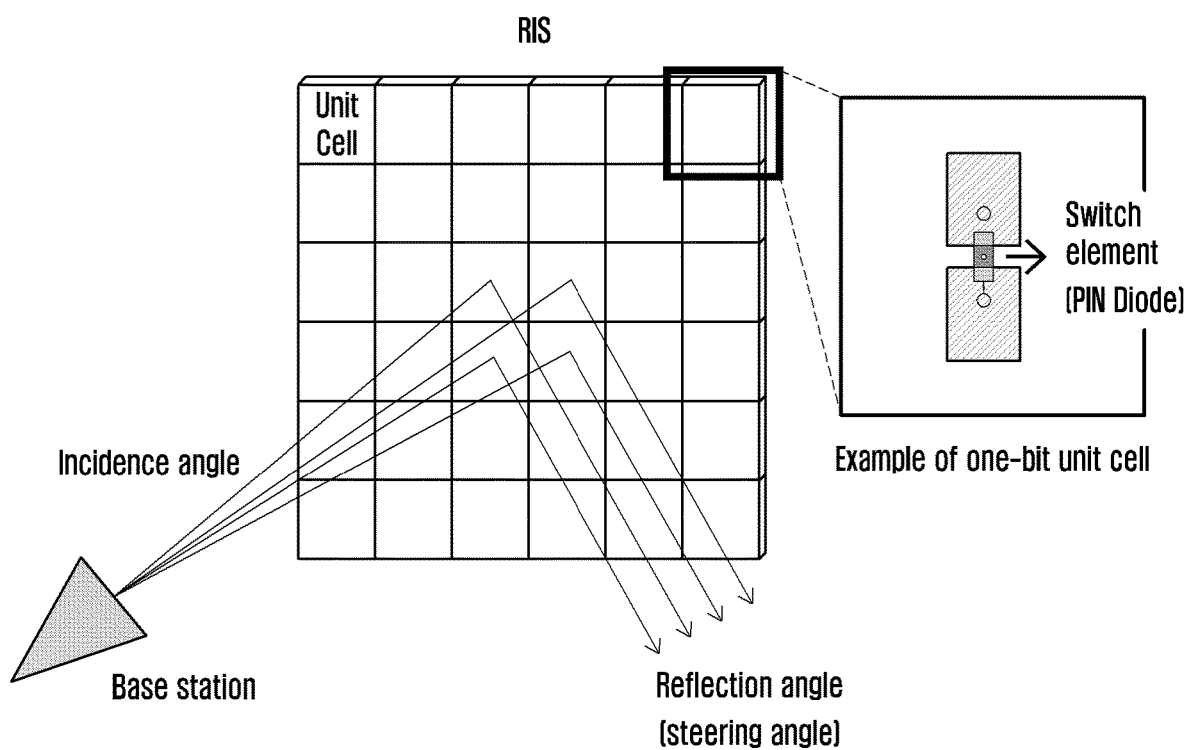
FIG. 2 illustrates an example of an RIS and an operation according to an embodiment of the present disclosure.
Figure 3:
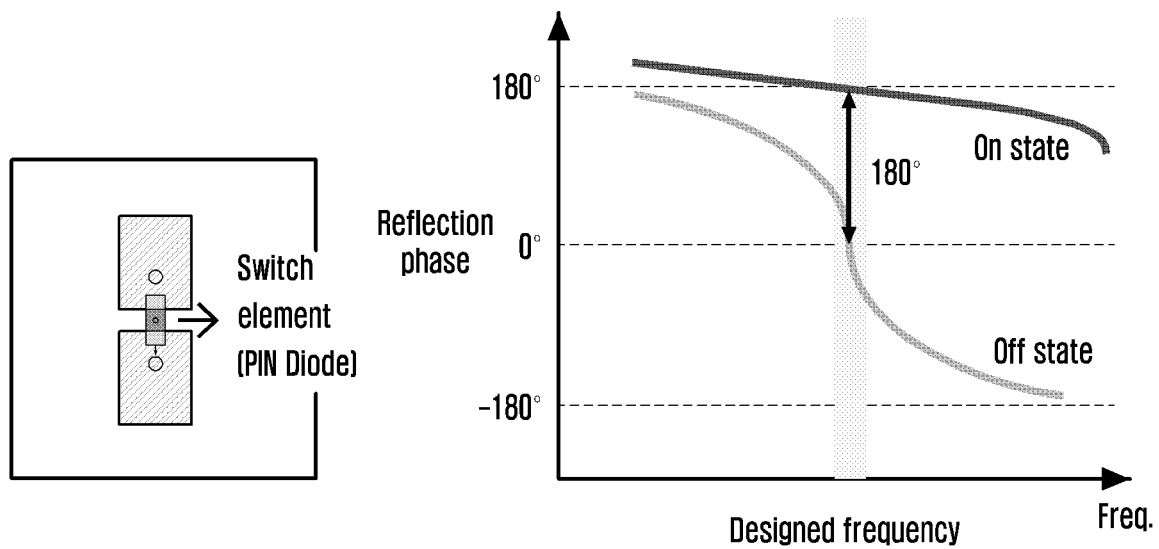
FIG. 3 illustrates an example of a one-bit unit cell structure and a reflection phase characteristic of a unit cell based on a state of a switch according to an embodiment of the present disclosure.
Figure 4:
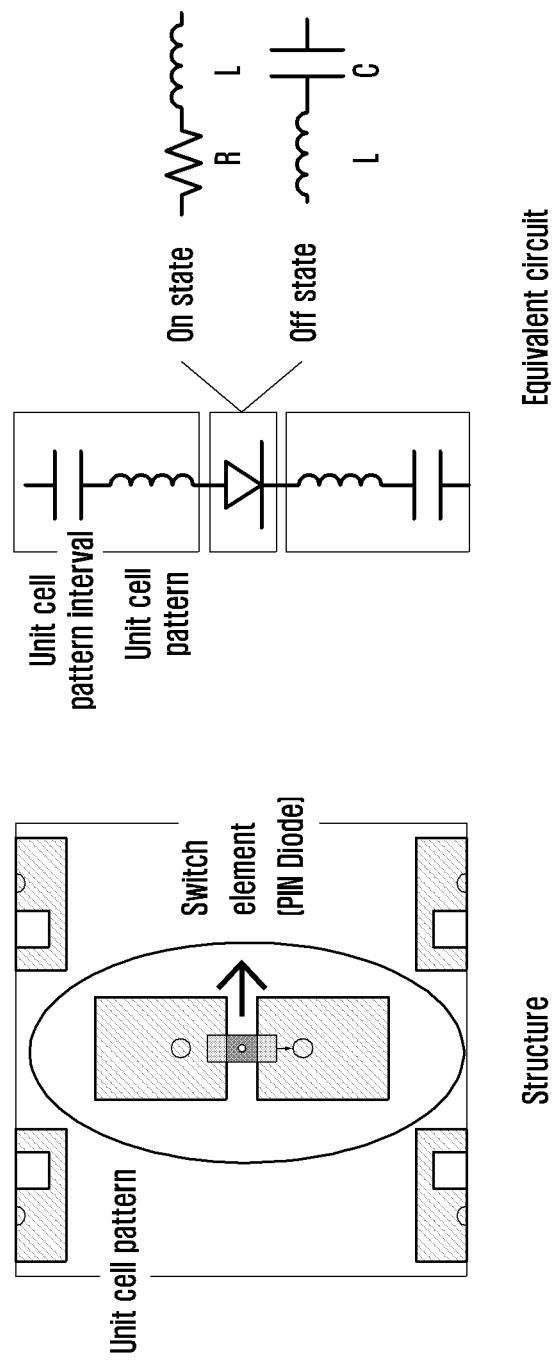
FIG. 4 illustrates an example of a unit cell structure and an equivalent circuit according to an embodiment of the present disclosure.
Figure 5:
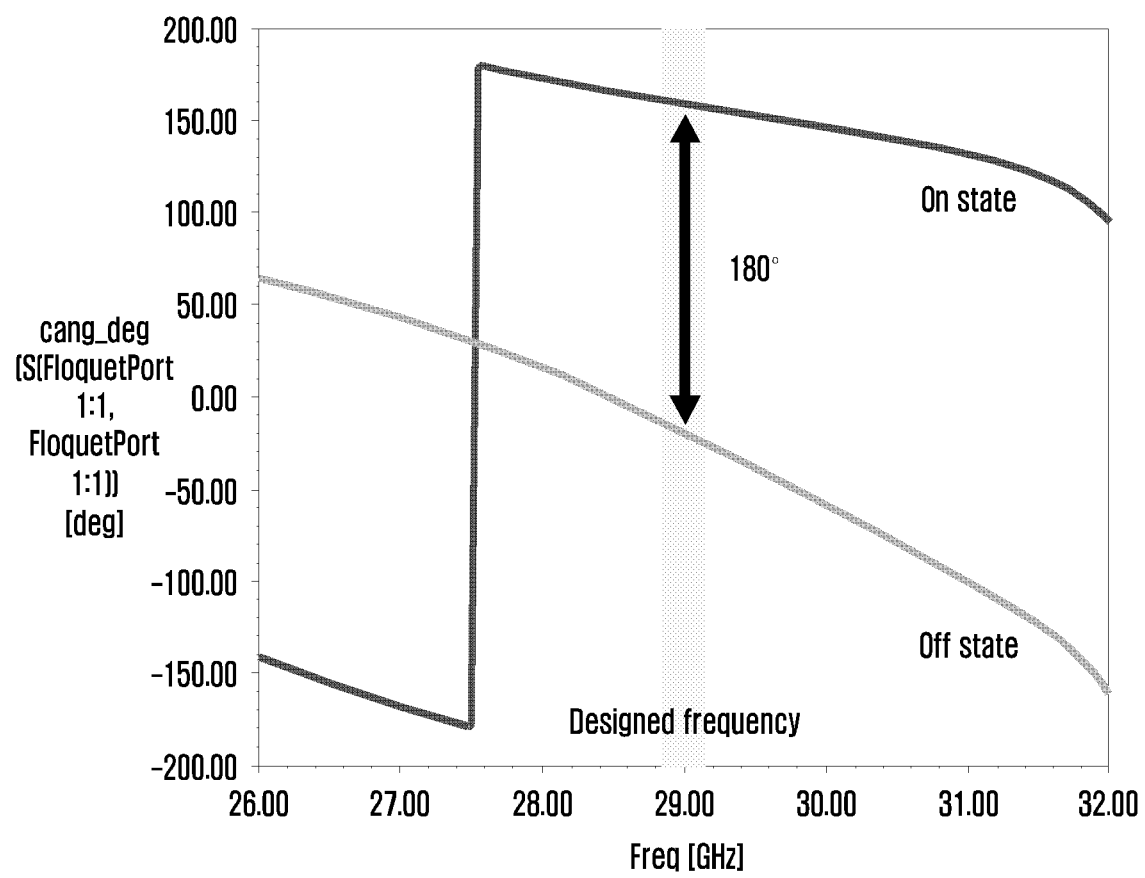
FIG. 5 illustrates a reflection phase characteristic based on a state of a switch according to an embodiment of the present disclosure.

FIG. 2 illustrates an example of an RIS and an operation thereof, FIG. 3 illustrates an example of a one-bit unit cell structure and a reflection phase characteristic of a unit cell based on a state of a switch according to an embodiment of the present disclosure, FIG. 4 illustrates an example of a unit cell structure and an equivalent circuit thereof, and FIG. 5 illustrates a reflection phase characteristic based on a state of a switch according to an embodiment of the present disclosure.

Referring to FIG. 2, the MS may be configured in a form in which a plurality of unit cells is repeatedly arranged. The RIS may control a direction of an electromagnetic field reflected (steered) from the RIS by adjusting adjust reflection phases of the unit cells. For example, a signal transmitted from a BS may be incident on the RIS, and reflected by adjusting a reflection angle (steering angle) by adjusting the reflection phases of the unit cells, thereby controlling the direction of the electromagnetic field (signal).

Generally, when designing a unit cell, a phase of a reflected wave may be adjusted by using an active element, such as a switch, as illustrated in FIG. 2 and FIG. 3. A one-bit (two-state) unit cell may be designed to have a reflection phase difference of 180° at a design frequency with respect to a specific incidence/reflection angle depending on on/off of a switch, as illustrated in FIG. 3.

Referring to FIG. 4, adjustment of a resonance point to adjust a reflection phase may be expressed by expressing a unit cell as an equivalent circuit and approximating a combination of inductance and capacitance. Here, since a resonance frequency is proportional to the square root of the product of these two components, the unit cell may be designed to have a reflection phase difference of 180° at a desired frequency by adjusting the resonance point according to on/off of the switch as illustrated in FIG. 5.

Specifically, a reflection phase of an electromagnetic wave reflected by the unit cell may be adjusted depending on a structure in which the unit cell is designed. To control the reflection phase of the unit cell, the unit cell may be expressed as an equivalent circuit as illustrated in FIG. 4, and a unit cell pattern may be expressed by approximating inductance (length) and capacitance (interval). Since the resonance frequency is proportional to the square root of the product of these two components, the unit cell may be designed to adjust the resonance point according to on/off of the switch by adjusting the length and interval of the unit cell pattern and to have a reflection phase difference of 180° at a desired frequency. FIG. 4 illustrates an example of a one-bit unit cell operating at 29 GHz and an equivalent circuit thereof, and the unit cell may be identified to have a reflection phase difference of 180° at 29 GHz according to a switch state of the unit cell as illustrated in FIG. 5.

However, the reflection phase characteristic of the unit cell changes under a condition where an incidence/reflection angle changes. This is because when the incidence/reflection angle increases, an effective area of the unit cell decreases, and thus a capacitance component is generated due to an effect that a distance between adjacent cells appears shorter, which will be described in detail below.

Figure 6:
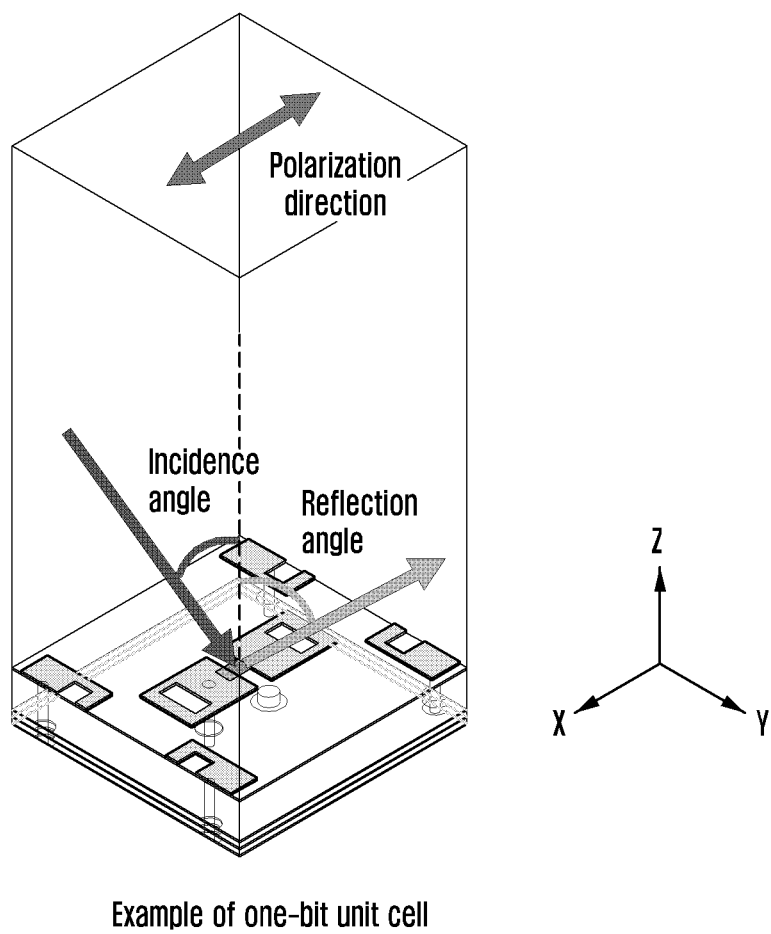
FIG. 6 illustrates an example of an incidence angle and a reflection angle of a unit cell according to an embodiment of the present disclosure.
Figure 7:
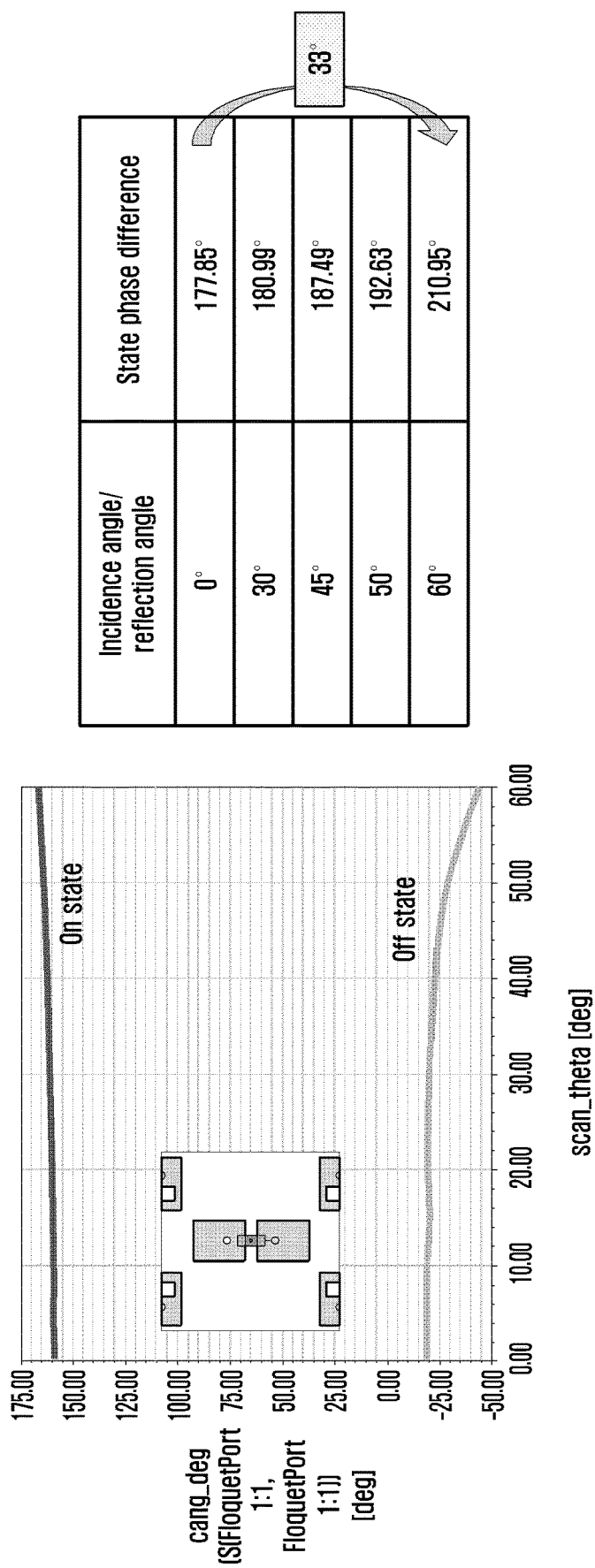
FIG. 7 illustrates an experimental example of a reflection phase difference based on a switch on/off according to an incidence angle and a reflection angle of a unit cell according to an embodiment of the present disclosure.
Figure 8:
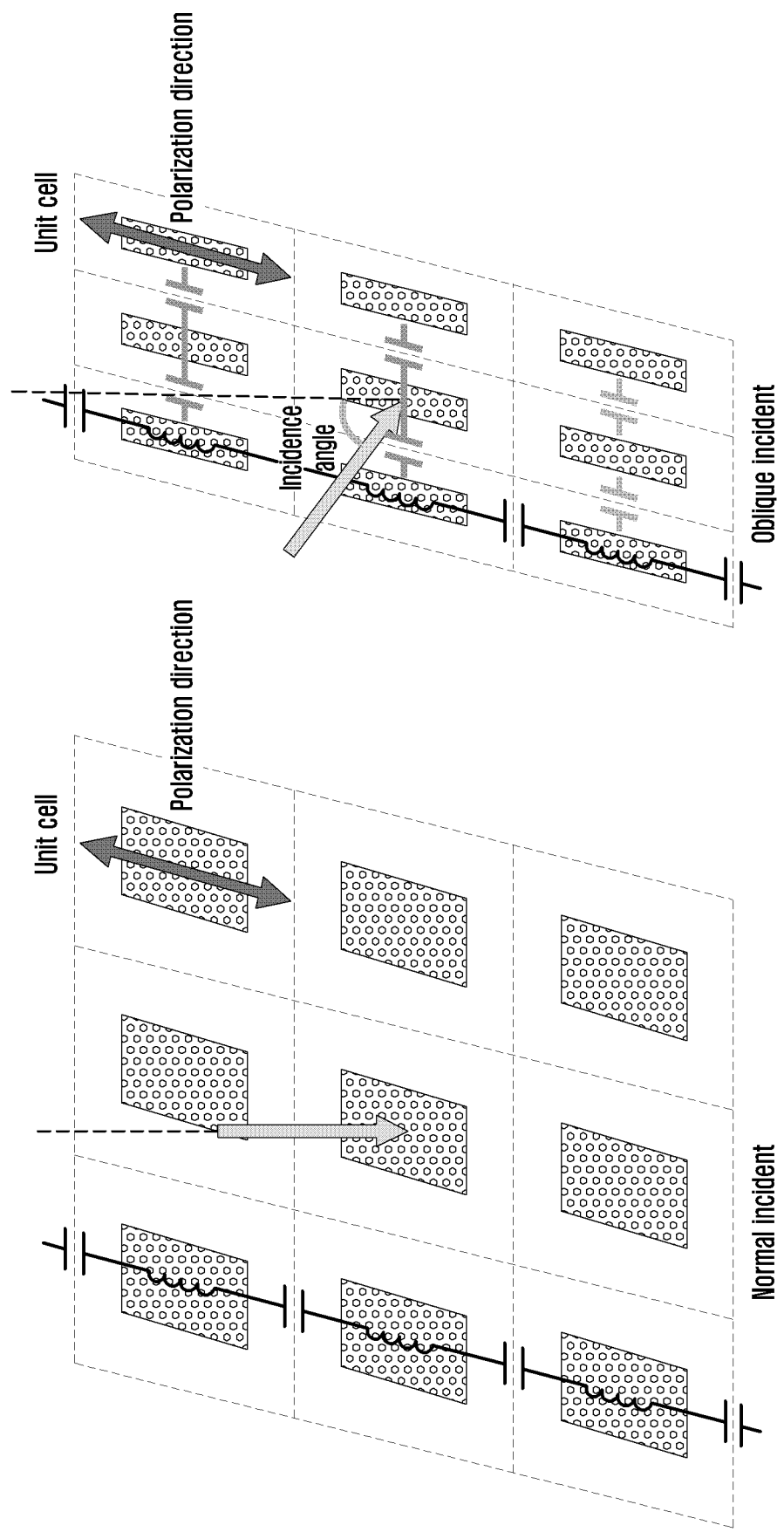
FIG. 8 illustrates an example of an effective area of a unit cell pattern based on a reflection angle and an incidence angle according to an embodiment of the present disclosure.

FIG. 6 illustrates an example of an incidence angle and a reflection angle of a unit cell according to an embodiment of the present disclosure, FIG. 7 illustrates an experimental example of a reflection phase difference according to a switch on/off based on an incidence angle and a reflection angle of a unit cell according to an embodiment of the present disclosure, and FIG. 8 illustrates an example of an effective area of a unit cell pattern based on a reflection angle and an incidence angle according to an embodiment of the present disclosure.

Conventionally, when designing a unit cell to have a reflection phase difference of 180° at a desired frequency, the unit cell is designed assuming that a base station is basically in a direction facing the unit cell of an RIS (i.e., a vertical direction of the unit cell) and an incidence angle is 0° relative to the vertical direction. Therefore, when the base station is located in the vertical direction of 0°, the unit cell may be operated to have a reflection phase difference of 180° depending on a switch on/off as designed. However, this is a limited propagation environment, and as illustrated in FIG. 6, when the base station deviates from the vertical direction based on the RIS and thus the incidence angle increases or when a direction in which an electromagnetic wave emitted from the base station is reflected and steered deviates from in the vertical direction and thus a reflection angle increases, the unit cell has a value other than the designed reflection phase difference of 180°, which eventually causes an error and a deterioration in performance. Ultimately, it is difficult to obtain a reflection phase difference of 180° depending on the incidence angle/reflection angle of the unit cell, which may affect actual communication performance, which is a major limitation in establishing a communication environment.

FIG. 7 shows a graph of the reflection phase difference of the switch on/off according to the incidence angle/reflection angle of the unit cell. As the incidence/reflection angle increases from 0° to 60°, the reflection phase difference according to the switch on/off of the unit cell may no longer be 180°. For example, as illustrated in FIG. 5, the reflection phase difference according to the on/off state of the switch is 177.85° at an incidence/reflection angle of 0° and 180.99° at an incidence/reflection angle of 30° but is 210.95° at an incidence/reflection angle of 60°. A difference between the reflection phase differences at the incidence/reflection angles of 0° and 60° increases up to 33°. In addition, as the incidence angle/reflection angle further increases, the reflection phase difference between the switch states of the unit cell further increases, which may be explained with reference to FIG. 8. FIG. 8 illustrates the effective area where the unit cell pattern is visible as the incidence/reflection angle increases. As the incidence/reflection angle increases, a distance between adjacent unit cells appears shorter and a capacitance component is generated. As a resonance frequency is reduced by the capacitance component, the reflection phase difference of the unit cell according to a switch state increases. Since this reflection phase error means that it is difficult for arranged unit cells to obtain a desired reflection phase, the size of a reflected electromagnetic wave is reduced due to this phase error.

To reduce this capacitance effect, the disclosure provides additionally disposing a dummy pattern between unit cell patterns when arranging unit cells so that the unit cells show an even reflection phase characteristic even under a condition where an incidence/reflection angle changes. Here, the dummy pattern is not a unit cell pattern that is directly connected to an active element, such as a switch, to actively operate, but is a structure that is disposed next to the unit cell patterns and is coupled to the dummy pattern to passively operate when the unit cell patterns operate.

When a current is induced in the unit cells by an electromagnetic wave, the induced current also flows in the dummy pattern in combination with the unit cell patterns. The dummy pattern may also be expressed as an equivalent circuit by approximating inductance and capacitance, and the dummy pattern may be designed to have a reflection phase difference of 180° at a desired frequency by combining inductance and capacitance of the unit cell patterns and the dummy pattern.

Therefore, even though the effective area of the unit cells decreases under a condition where the incidence/reflection angle increases, the dummy pattern disposed between the unit cell patterns occupies an empty space, thus preventing an increase in capacitance component between adjacent unit cells. As a result, a reflection phase characteristic (reflection phase difference of 180°) of the unit cells may be evenly maintained even under a condition where the incidence/reflection angle changes. Further, even in an actual communication environment in which an RIS configured by arranging the unit cells, a base station, and a terminal (UE) have spatially various locations or move, performance may be maintained without significant loss.

Figure 9:
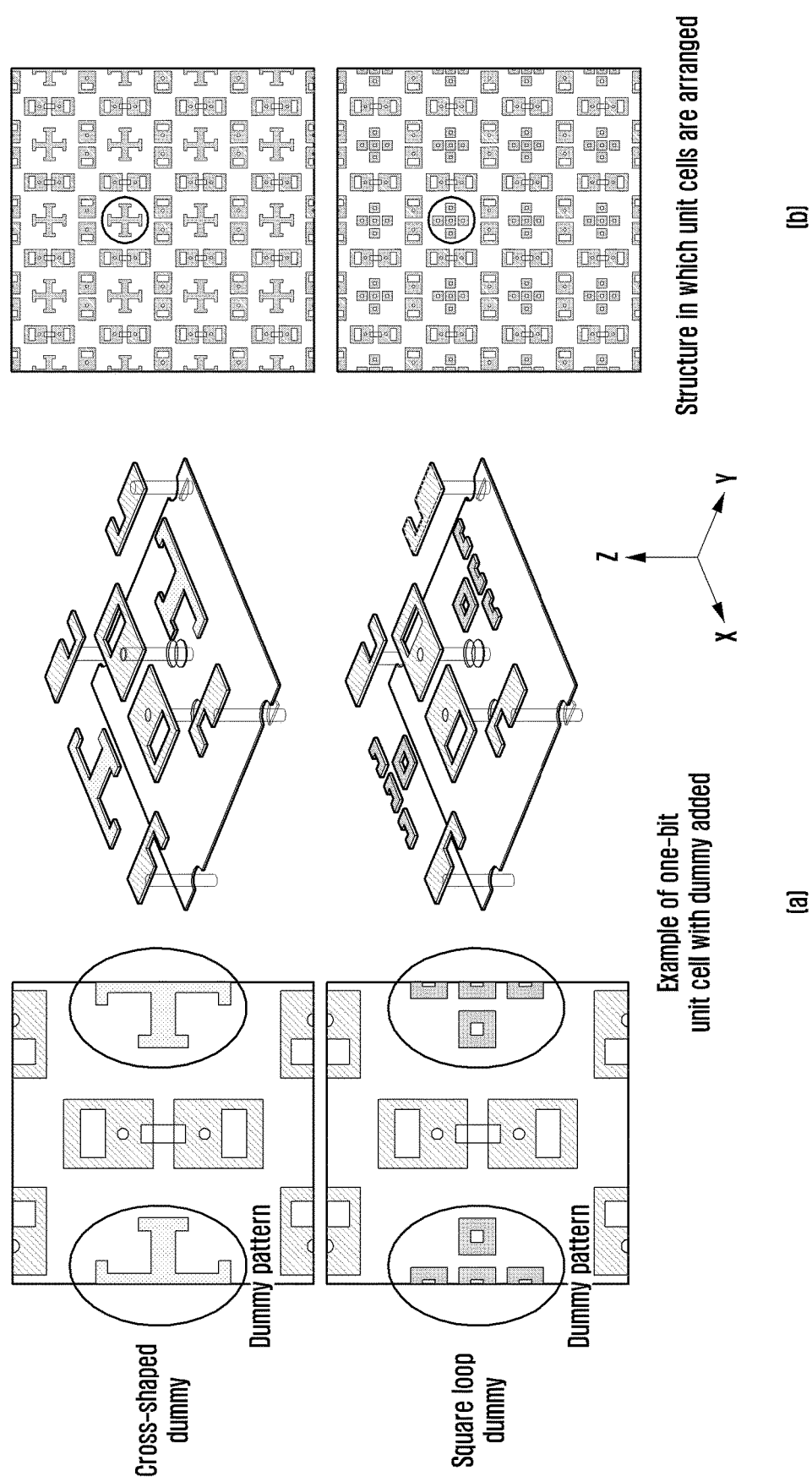
FIG. 9 illustrate examples of unit cells with a dummy pattern added and RISs including the same according to an embodiment of the present disclosure.
Figure 10:
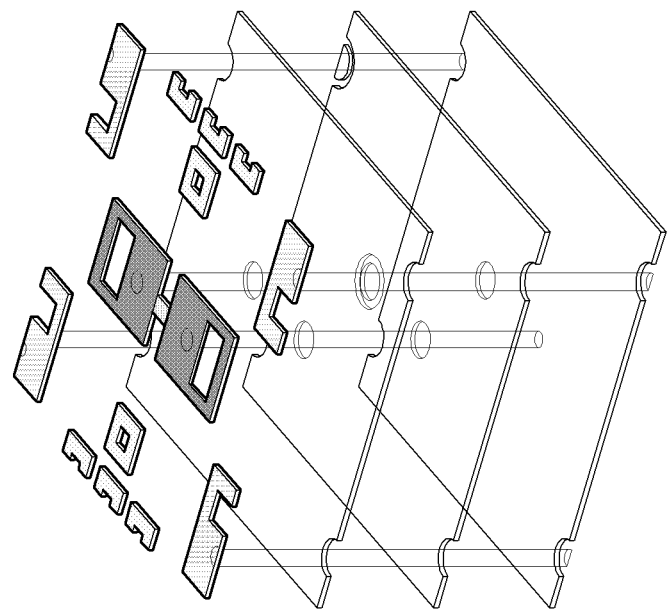
FIG. 10 illustrates an example of a unit cell with an example of a dummy pattern added and an RIS including the same according to an embodiment of the present disclosure.
Figure 10:
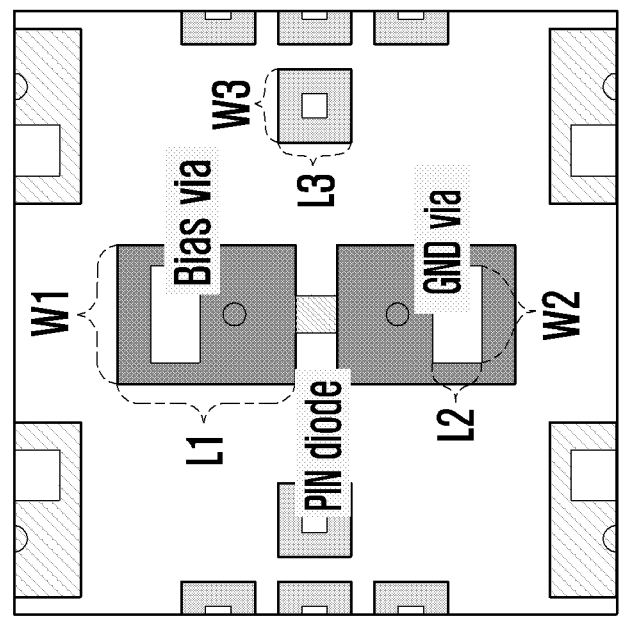
Figure 11:
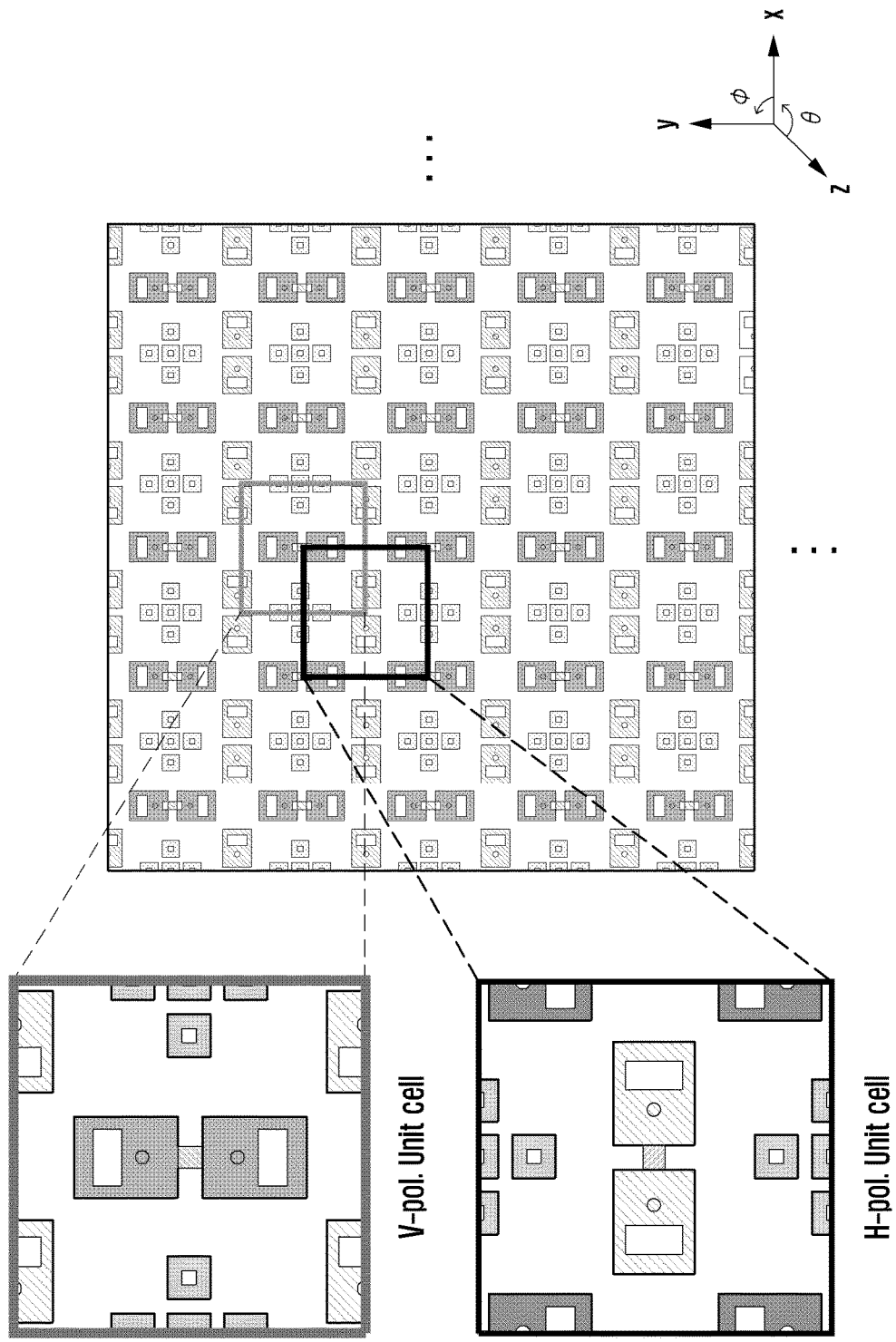
FIG. 11 illustrates an MS viewed from a vertical direction according to an embodiment of the present disclosure

FIG. 9 illustrate examples of unit cells with a dummy pattern added and RISs including the same according to an embodiment of the present disclosure, FIG. 10 illustrates an example of a unit cell with an example of a dummy pattern added and an RIS including the same according to an embodiment of the present disclosure, and FIG. 11 illustrates an MS viewed from the vertical direction according to an embodiment of the present disclosure.

FIG. 9 illustrate dummy pattern structures that may be additionally disposed between unit cell patterns directly connected to an active element, such as a switch.

By disposing a dummy pattern between unit cell patterns, a reflection phase difference of a unit cell according to a switch state may be evenly maintained even under a condition where an incidence/reflection angle changes. Here, the dummy pattern is not a unit cell pattern that is directly connected to an active element, such as a switch, to actively operate, but is a structure that is disposed next to the unit cell patterns and is coupled to the dummy pattern to passively operate when the unit cell patterns operate.

Although FIG. 9 shows two illustrative dummy patterns, the disclosure is not limited thereto. Any dummy pattern may be disposed as long as the dummy pattern is disposed between unit cell patterns to enable the reflection phase difference of the unit cell according to the switch state to be evenly maintained even under the condition where the incidence/reflection angle changes.

Various forms of dummy patterns may be designed to operate at a desired frequency in combination with a unit cell pattern, and the size, length, width, and interval of a dummy pattern may be adjusted according to a unit cell pattern (inductance and capacitance components of a unit cell in an equivalent circuit are adjusted) to satisfy a reflection phase characteristic.

In addition, an optimal size and arrangement interval of a unit cell are determined depending on a frequency, and sizes of a unit cell pattern and a dummy pattern may be predicted to some extent accordingly. The dummy pattern may be disposed on the same layer as the unit cell pattern to be coupled therewith when the unit cell pattern operates. For example, the unit cell pattern and the dummy pattern may be located in a top layer of an MS. The dummy pattern may be designed in a symmetric structure in view of a polarization direction. Accordingly, the dummy pattern may obtain the same performance symmetrically even based on the vertical direction (0°) of the unit cell. FIG. 9 show two structures of (a) a cross-shaped dummy and (b) a square loop dummy, respectively.

The unit cells illustrated in FIG. 9 operate with one bit at 29 GHz by using one switch element and are designed to have a size of 5 mm in width and of 5 mm in length ($\lambda 0/2 \approx 5$ mm @ 29 GHz). However, this size is an example, and it is obvious to those skilled in the art that the size may be changed. The two illustrative dummy patterns are located on the same top layer as the unit cell patterns, have a single-layer structure, and are symmetrical in all directions so that a polarization direction is not affected. In the illustrative dummy structures, the length of a cross (inductance), the size of a square loop (inductance), an arrangement type and interval (capacitance), and the like be parameters. These dummy structure may be applied not only to a one-bit unit cell but also to a two-bit or multi-bit unit cell.

Specifically, as illustrated in FIG. 9, FIG. 10, and FIG. 11, a vertical polarization (V-pol.) unit cell pattern may be located at the center of unit cells. Horizontal polarization (H-pol.) unit cell patterns may be located on four edges of unit cells. Accordingly, ¼ of the horizontal polarization unit cell patterns may be located at each of the four edges of the unit cells. The vertical polarization unit cell pattern may include two (copper) elements, and a switch may be located between the two elements. A horizontal polarization unit cell pattern may also include two elements, and a switch may be located between the two elements. According to an embodiment, the vertical polarization unit cell pattern and the horizontal polarization unit cell pattern may have the same shape, but may have different directions, which are vertical and horizontal (rotated by) 90°. When the vertical polarization unit cell pattern and the horizontal polarization unit cell pattern have the same shape, a unit cell pattern may be a combination of two rectangular elements having a width of W1 and a length of L1. There may be a rectangular hole in the center of the elements to adjust capacitance and inductance values. The hole may have a width of W2 and a length of L2. For example, W1 may be 1.13 mm, L1 may be 1.44 mm, W2 may be 0.8 mm, and L2 may be 0.4 mm.

A dummy pattern may be located between the unit cell patterns. According to an embodiment, the dummy pattern may be cross-shaped as illustrated in (a) FIG. 9. The dummy pattern may be located in a rotated T shape on left and right sides of one unit cell (or in a T shape on upper and lower sides), and when two horizontal unit cells are combined, dummy patterns form a cross shape. The T-shaped element may be formed with slightly protruding edges. Accordingly, the dummy pattern may be configured such that the small-sized unit cell has intended capacitance and inductance.

Alternatively, according to an embodiment, a dummy pattern may include a plurality of square loops as illustrated in (b) FIG. 9, FIG. 10, and FIG. 11. For example, as illustrated, five square loops may form a dummy pattern in a cross shape. The dummy pattern may be located in a rotated T shape on left and right sides of one unit cell (or in a T shape on upper and lower sides), and when two horizontal unit cells are combined, five square loops may be configured in a cross shape. In this case, each of the square loops may have a width of W3 and a length of L3. For example, W3 may be 0.6 mm, and L3 may be 0.6 mm.

According to an embodiment, the unit cell may be designed as a four-layer printed circuit board (PCB), Isola I-tera MT may be used as a dielectric substrate, and relative permittivity may be 3.45, loss tangent may be 0.0031, and total thickness may be 1 mm. A positive-intrinsic-negative (PIN) diode (MADP-000907-14020P) may be used as an active component to control EM v-field distribution of the unit cell. Effective values of a simplified equivalent circuit model of the PIN diode may be Ron=6Ω, Lon=30 pH, Loff=30 pH, and Coff=50 pH at 29 GHz.

The dummy patterns may also be connected to a voltage bias line and ground plane through a via hole.

To have the same two-dimensional beam steering performance in a spherical coordinate system, unit cell intervals in an x-axis direction and a y-axis direction may be designed to be the same. As a result, as illustrated in FIG. 11, when an RIS is designed in a form of an N×N array, corner areas of unit cells overlap each other. Due to a provided overlapping structure, a half-wavelength unit cell interval may be maintained in the x-axis direction and y-axis direction without expanding an area. In particular, even though some areas overlap, the V-pol and H-pol. unit cells may operate independently without affecting each other's state changes.

Figure 12A:
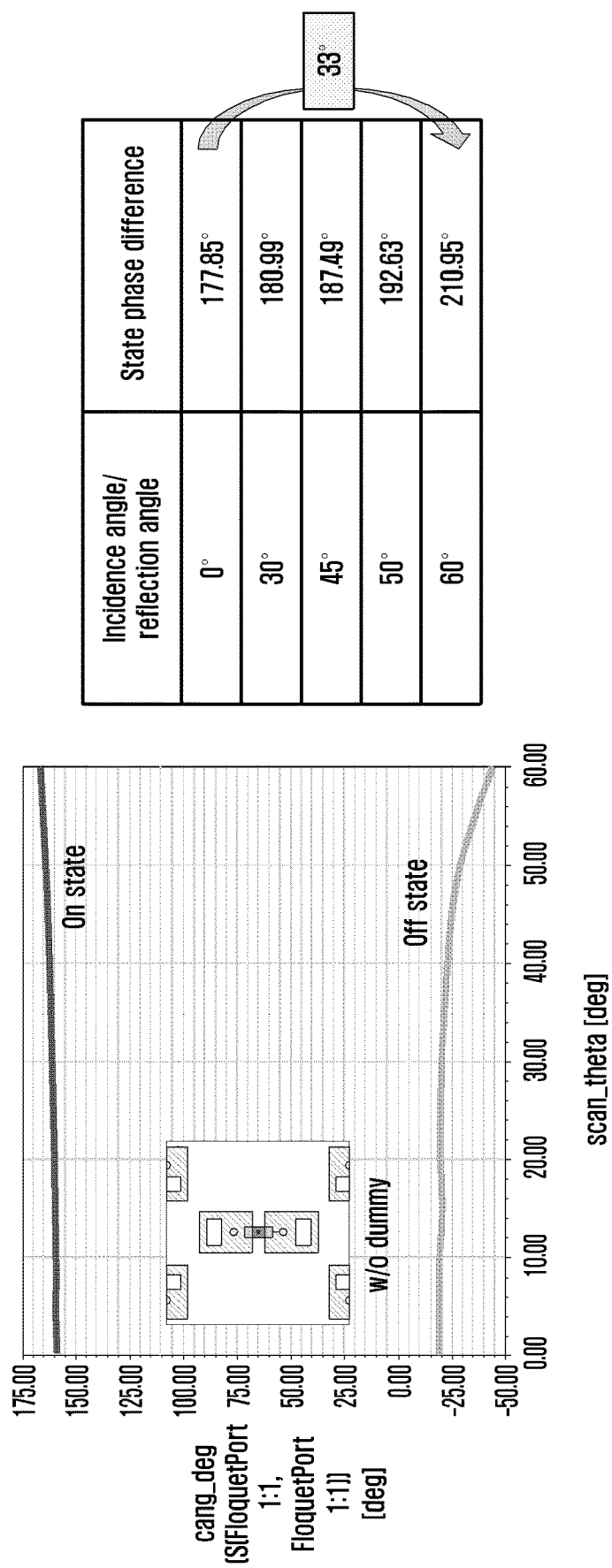
FIGS. 12A-C illustrate examples of experimental results of a switch-on/off reflection phase difference of each unit cell according to an incidence angle/reflection angle according to an embodiment of the present disclosure.
Figure 12B:
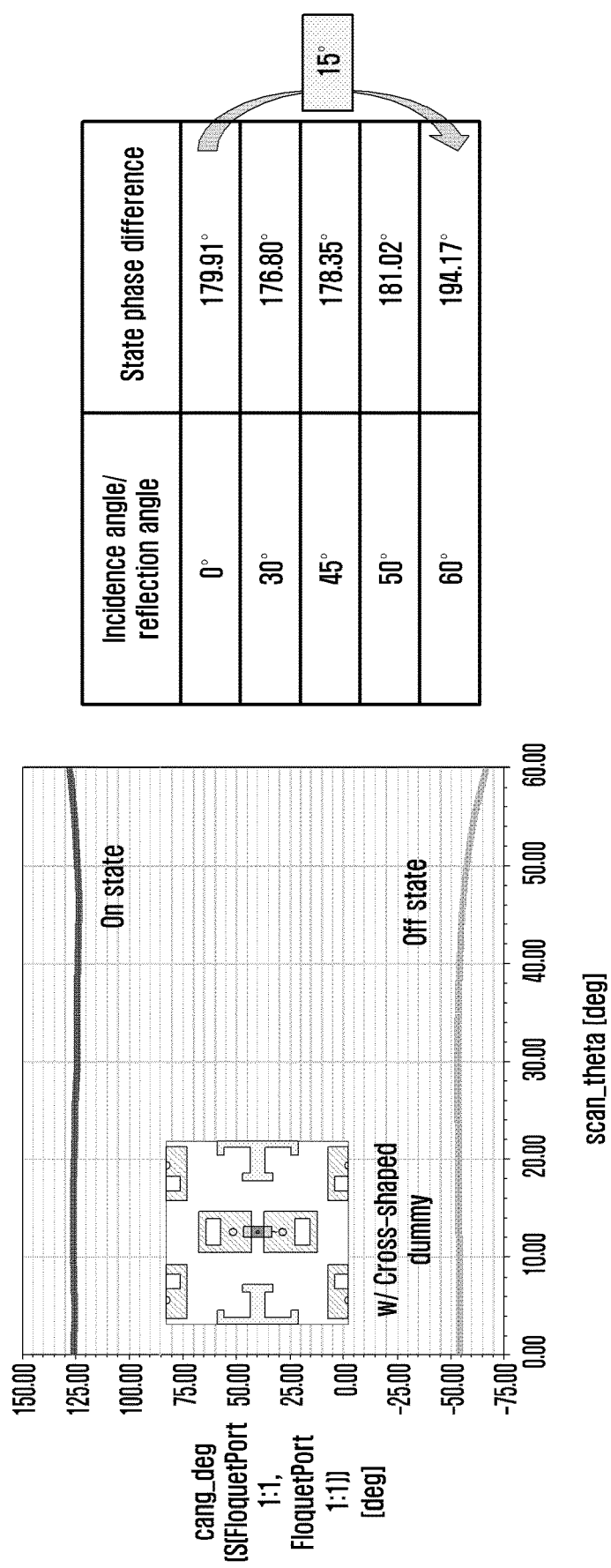
Figure 12C:
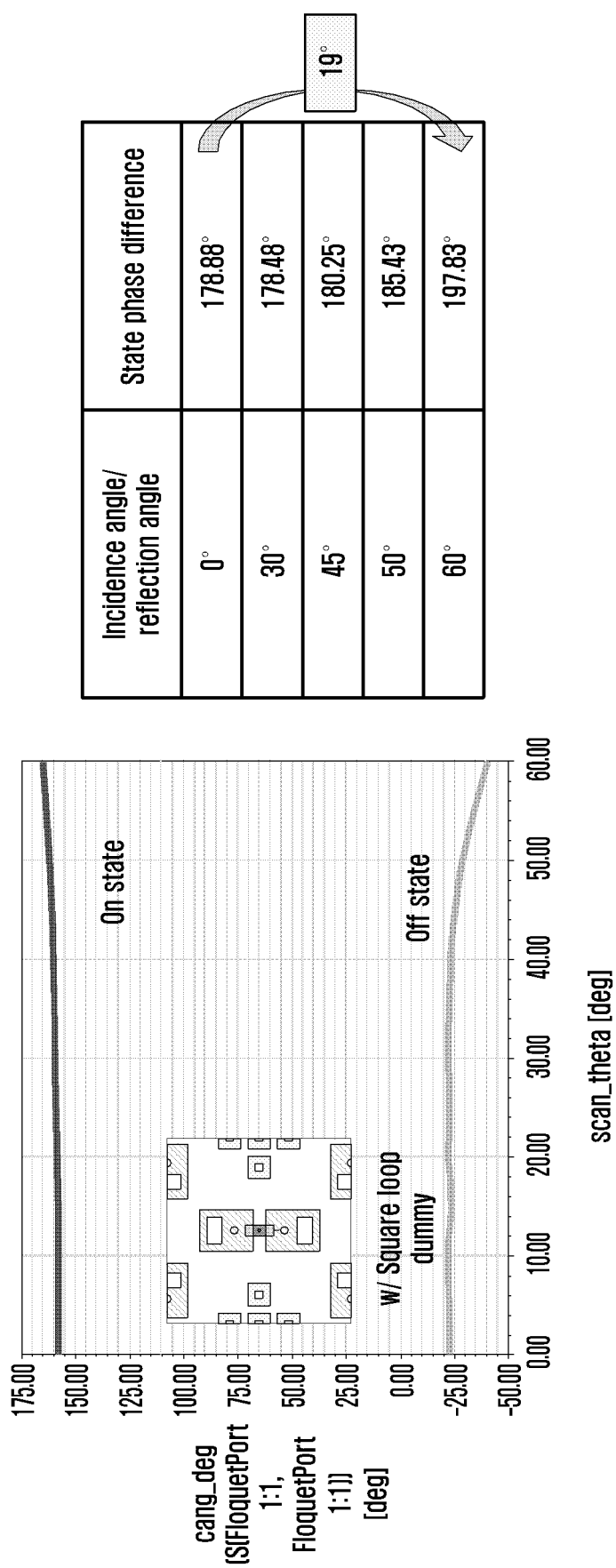
Figure 13:
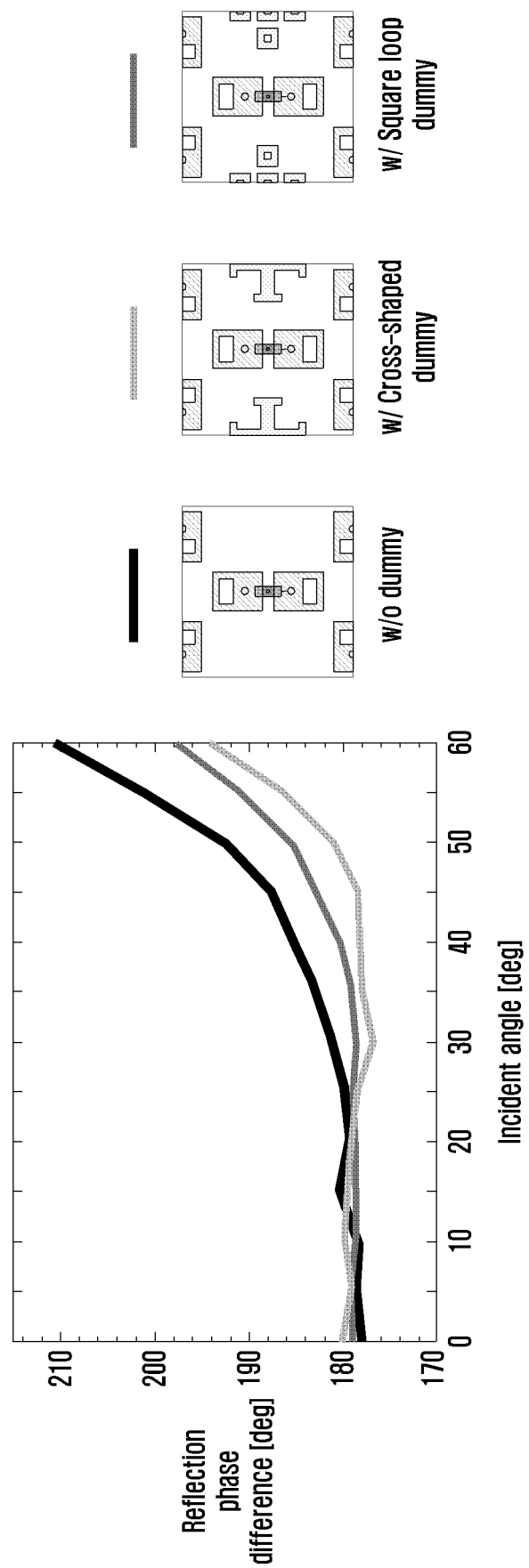
FIG. 13 illustrates another example of an experimental result of a switch-on/off reflection phase difference of each unit cell according to an incidence angle/reflection angle according to an embodiment of the present disclosure.
Figure 14:
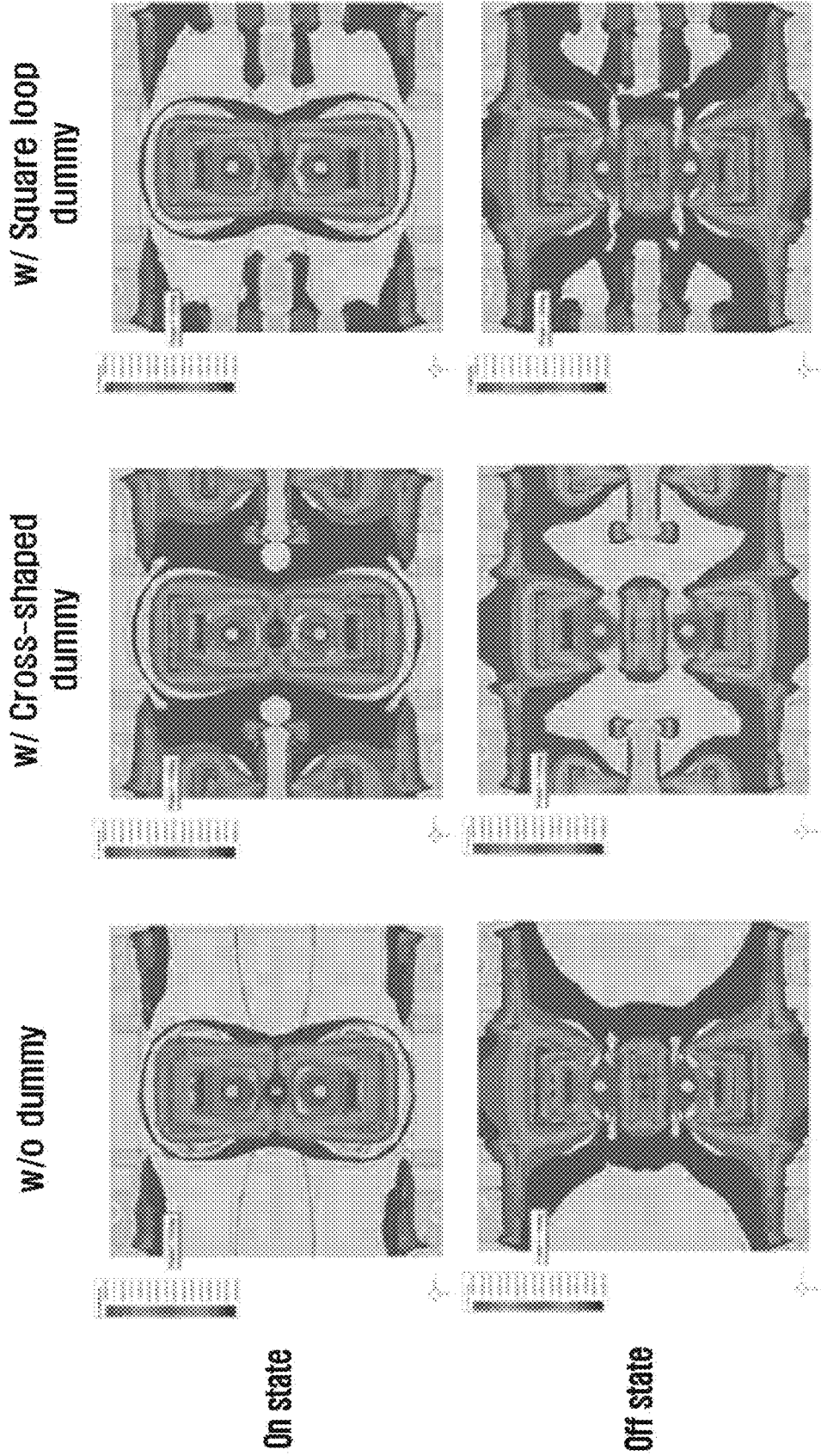
FIG. 14 illustrates an example of field distribution in each unit cell according to a switch state according to an embodiment of the present disclosure.
Figure 15:
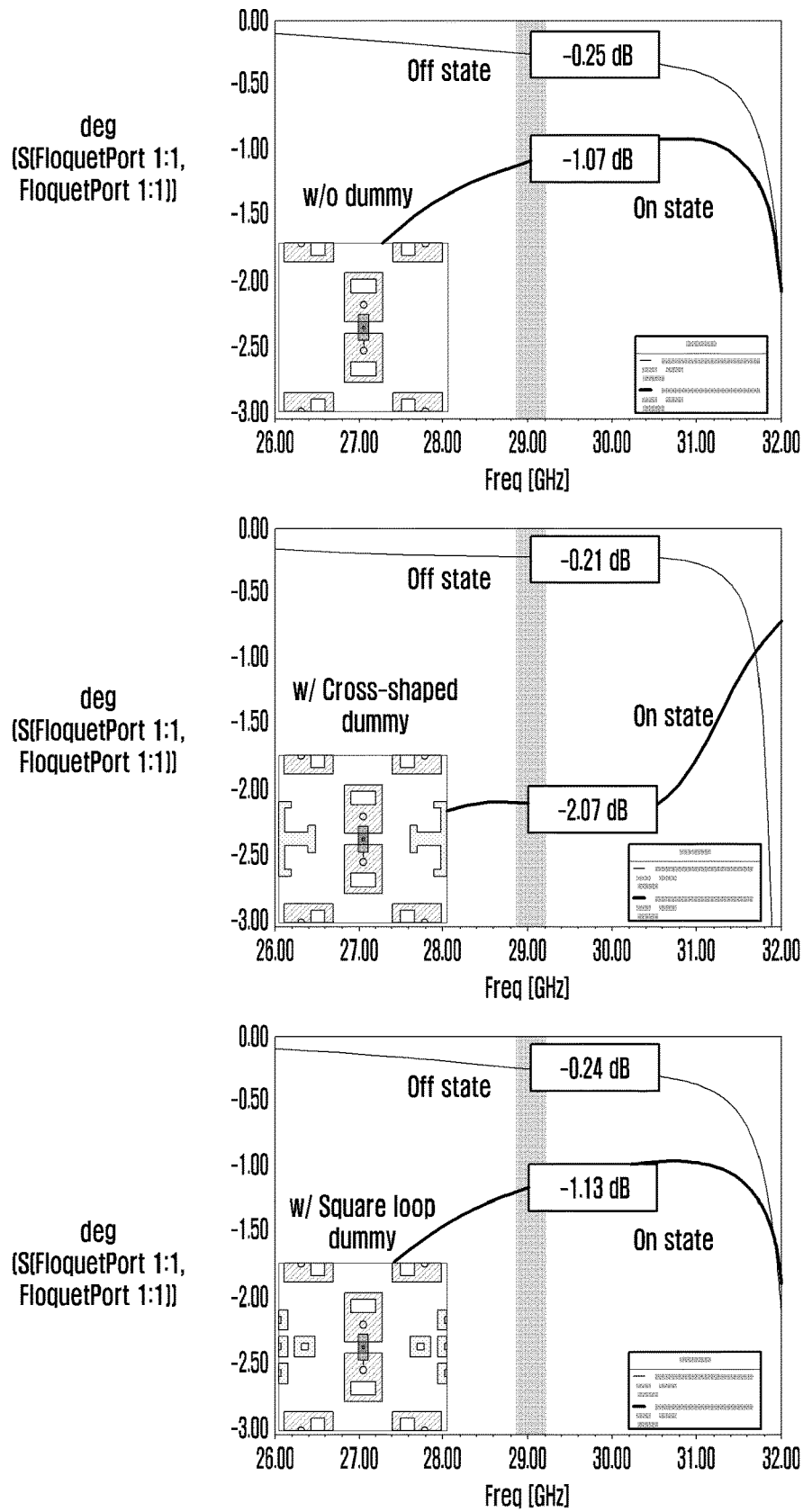
FIG. 15 illustrates an example of a reflection loss characteristic of each unit cell according to a switch state according to an embodiment of the present disclosure.

FIGS. 12A-C illustrate examples of experimental results of a switch-on/off reflection phase difference of each unit cell based on an incidence angle/reflection angle according to an embodiment of the present disclosure, FIG. 13 illustrates another example of an experimental result of a switch-on/off reflection phase difference of each unit cell according to an incidence angle/reflection angle according to an embodiment of the disclosure, FIG. 14 illustrates an example of field distribution in each unit cell according to a switch state according to an embodiment of the disclosure, and FIG. 15 illustrates an example of a reflection loss characteristic of each unit cell according to a switch state according to an embodiment of the disclosure.

FIGS. 12A-C and FIG. 13 show graphs illustrating switch-on/off reflection phase differences of a conventional unit cell having no dummy pattern and unit cells in which the two illustrative dummy pattern structures provided in the embodiments related to FIG. 9A and FIG. 9B are additionally disposed according to an incidence angle/reflection angle. In the conventional unit cell having no dummy pattern, as the incidence angle/reflection angle increases from 0° to 60°, the reflection phase difference of the unit cell according to the switch on/off increases to 210° or greater, thus having an error of about 33° compared to that when the incidence/reflection angle is 0°. However, the unit cells with the dummy patterns additionally disposed have an even reflection phase characteristic in that errors in the reflection phase differences according to the switch on/off are about 15° and 19° depending on the respective dummy structures even under a condition where the incidence angle/reflection angle changes from 0° to 60°.

Graphs showing field distributions and reflection loss characteristics of the conventional unit cell and the unit cells with the dummy patterns additionally disposed according to a switch state are illustrated in FIG. 14 and FIG. 15.

Referring to the field distributions of the respective unit cells illustrated in FIG. 14, in the unit cells with the dummy patterns additionally disposed, the dummy patterns are coupled with a unit cell pattern. In particular, the cross-shaped dummy pattern is more strongly coupled to the unit cell pattern than the square loop dummy pattern, and thus the unit cell has a more favorable reflection phase characteristic under the condition where the incidence/reflection angle changes. However, since strong coupling between the unit cell pattern and the dummy pattern may reduce the reflection loss characteristics of the unit cell as shown in the graph of FIG. 15, a gain may be reduced when an RIS in which a plurality of unit cells is arranged operates, which may cause a decrease in transmission and reception performance. However, the square loop dummy has a similar reflection loss characteristic to that of the unit cell having no dummy pattern while maintaining coupling with the unit cell pattern to a certain degree. Therefore, in an actual communication environment where various incidence/reflection angle conditions are required, an RIS may be configured by arranging unit cells to which different forms of dummy patterns are applied in addition to the illustrated cross-shaped dummy and square loop dummy.

Although specific embodiments have been described in the detailed description of the disclosure, it will be apparent that various modifications and changes may be made thereto without departing from the scope of the disclosure. Therefore, the scope of the disclosure should not be defined as being limited to the embodiments but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A unit cell for a reconfigurable intelligent surface (RIS), the unit cell comprising:
    a unit cell pattern formed in a direction corresponding to a polarization direction, the unit cell pattern configured to adjust a reflection phase;
    a switch operably connected to the unit cell pattern, the switch configured to adjust the reflection phase; and
    a dummy pattern positioned between unit cell patterns in case that a plurality of unit cells is arranged, the dummy pattern configured to:
        prevent an increase in capacitance component between unit cells among the plurality of unit cells despite an increase in an incidence angle or a reflection angle, and
        maintain a reflection phase difference of the unit cell according to an on/off operation of the switch that is an even value despite the increase in the incidence angle or the reflection angle.

2. The unit cell of claim 1, wherein the unit cell pattern comprises two elements that are connected, by the switch, each other.

3. The unit cell of claim 1, wherein the dummy pattern includes a symmetric structure.

4. The unit cell of claim 1, wherein the unit cell pattern is located in a vertical direction at a center of the unit cell, and
    wherein the dummy pattern comprises a T-shaped pattern disposed on a left side and a right side of the unit cell.

5. The unit cell of claim 1, wherein the unit cell pattern is located in a vertical direction at a center of the unit cell, and
    wherein the dummy pattern comprises at least one square-loop pattern disposed on a left side and a right side of the unit cell.

6. The unit cell of claim 5, wherein the dummy pattern includes the at least one square-loop pattern arranged in a cross shape.

7. The unit cell of claim 1, wherein the reflection phase difference is 180°.

8. A reconfigurable intelligent surface (RIS) comprising:
    at least one unit cell, wherein the unit cell comprises:
        a unit cell pattern formed in a direction corresponding to a polarization direction, the unit cell configured to adjust a reflection phase;
        a switch operably connected to the unit cell pattern, the switch configured to adjust the reflection phase; and
        a dummy pattern positioned between unit cell patterns in case that a plurality of unit cells is arranged, the dummy pattern configured to:
            prevent an increase in capacitance component between unit cells among the plurality of unit cells despite an increase in an incidence angle or a reflection angle, and
            maintain a reflection phase difference of the unit cell according to an on/off operation of the switch that is an even value despite the increase in the incidence angle or the reflection angle.

9. The RIS of claim 8, wherein the unit cell pattern comprises two elements that are connected, by the switch, each other.

10. The RIS of claim 8, wherein the dummy pattern includes a symmetric structure.

11. The RIS of claim 8, wherein the unit cell pattern is located in a vertical direction at a center of the unit cell, and
    wherein the dummy pattern comprises a T-shaped pattern disposed on a left side and a right side of the unit cell.

12. The RIS of claim 8, wherein the unit cell pattern is located in a vertical direction at a center of the unit cell, and
    wherein the dummy pattern comprises at least one square-loop pattern disposed on a left side and a right side of the unit cell.

13. The RIS of claim 12, wherein the dummy pattern includes the at least one square-loop pattern arranged in a cross shape.

14. The RIS of claim 8, wherein the reflection phase difference is 180°.

15. The RIS of claim 8, further comprising a controller configured to control on/off of the switch.

* * * * *